United States Patent [19]

Coll et al.

[11] Patent Number: 4,543,790
[45] Date of Patent: Oct. 1, 1985

[54] MASTER CYLINDER AND BRAKE BOOSTER ASSEMBLY

[75] Inventors: Juan V. Coll; Joaquim F. Bofill; Juan S. Bacardit, all of Barcelona, Spain

[73] Assignee: Bendiberica, S.A., Barcelona, Spain

[21] Appl. No.: 585,015

[22] Filed: Mar. 2, 1984

Related U.S. Application Data

[63] Continuation of Ser. No. 283,592, Jul. 15, 1981, abandoned.

[51] Int. Cl.⁴ .............................................. B60T 13/00
[52] U.S. Cl. ................................ 60/547.1; 91/369 A; 91/376 R
[58] Field of Search ............ 60/547.1, 552, 553, 60/554, 551; 92/107; 91/369 A, 376 R

[56] References Cited

U.S. PATENT DOCUMENTS

| | | | |
|---|---|---|---|
| 2,900,962 | 8/1959 | Ingres | 60/547.1 |
| 2,929,215 | 3/1960 | Stelzer | 60/547.1 |
| 2,929,216 | 3/1960 | Stelzer | 60/553 |
| 2,957,454 | 10/1960 | Stelzer | 60/551 |
| 3,408,815 | 11/1968 | Stelzer | 60/553 |
| 3,564,849 | 2/1971 | Huruta | 60/553 |
| 4,365,538 | 12/1982 | Andoh | 92/107 |

FOREIGN PATENT DOCUMENTS

| | | | |
|---|---|---|---|
| 1131534 | 6/1962 | Fed. Rep. of Germany . | |
| 2361258 | 3/1978 | France . | |
| 22133 | 9/1969 | Japan | 60/547.1 |
| 2070172 | 9/1981 | United Kingdom | 60/547.1 |
| 2073345 | 10/1981 | United Kingdom | 60/547.1 |
| 2074268 | 10/1981 | United Kingdom | 60/547.1 |

Primary Examiner—Abraham Hershkovitz
Attorney, Agent, or Firm—Larry J. Palguta; Ken C. Decker

[57] ABSTRACT

A master-cylinder and brake booster assembly in which the movable piston of the booster is mechanically coupled to the piston or pistons of the master-cylinder by means of a pulling rod protruding from the axial wall of the atmospheric actuation enclosure of the depression chamber of said booster.

12 Claims, 5 Drawing Figures

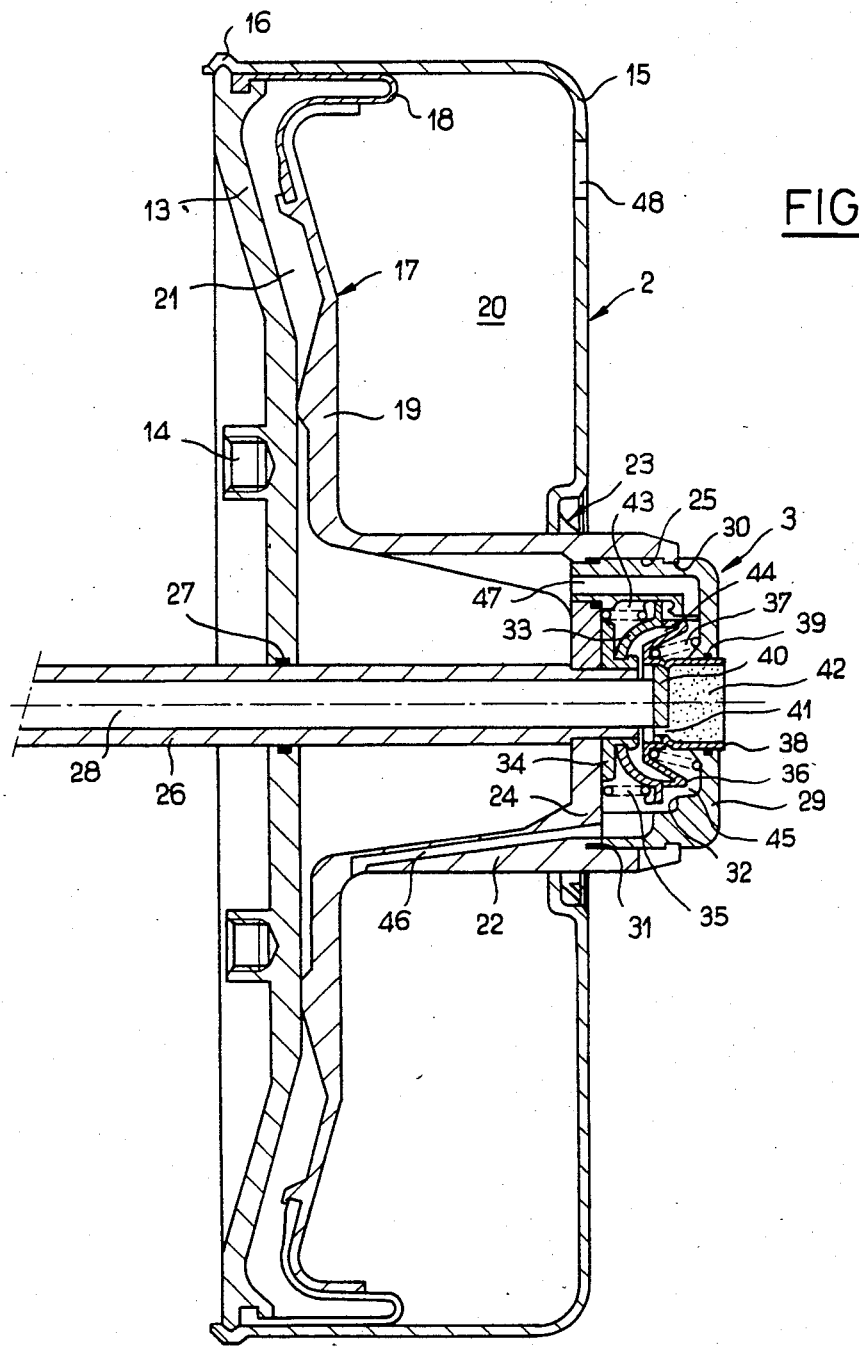
FIG_1

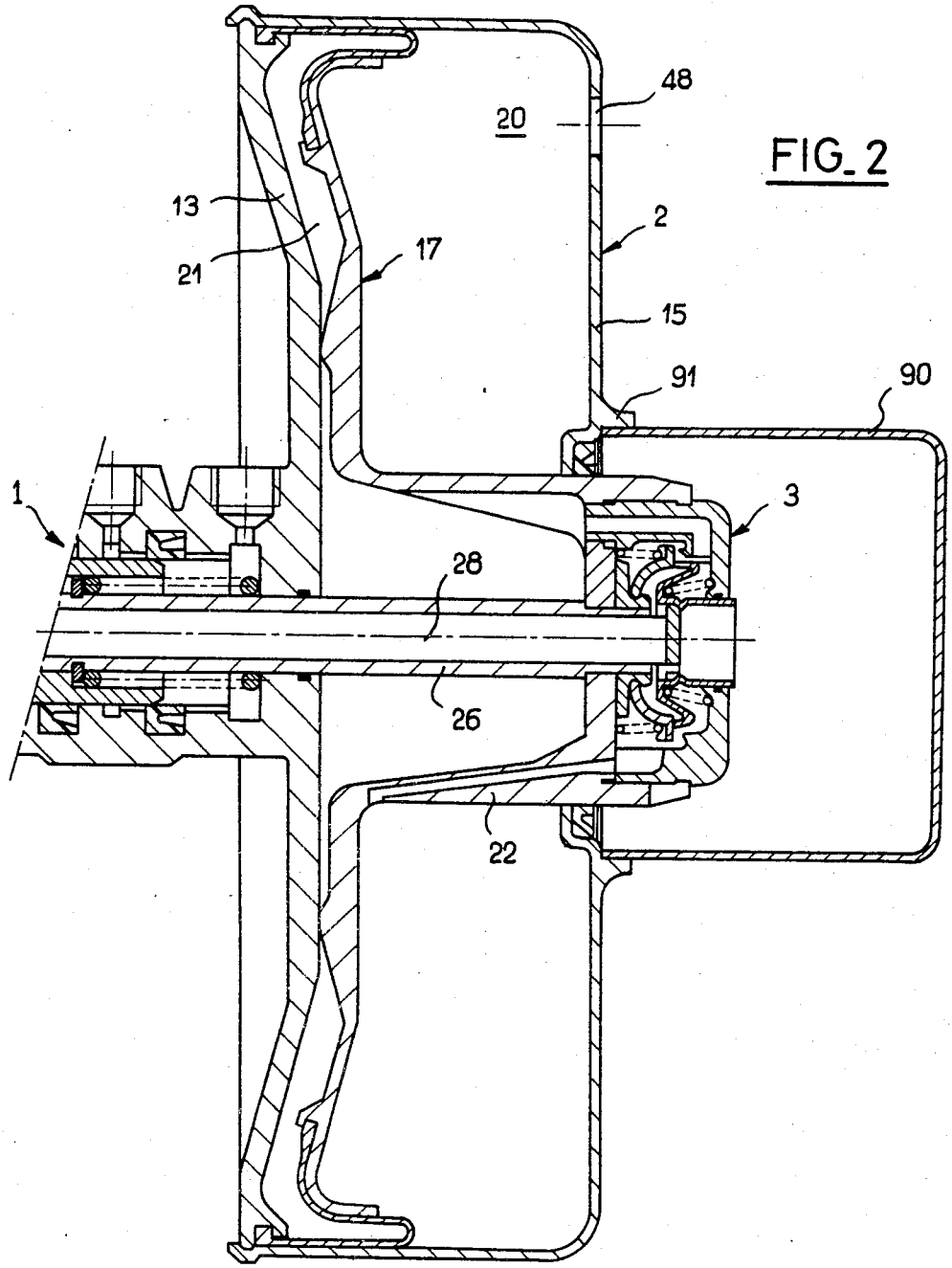
FIG_2

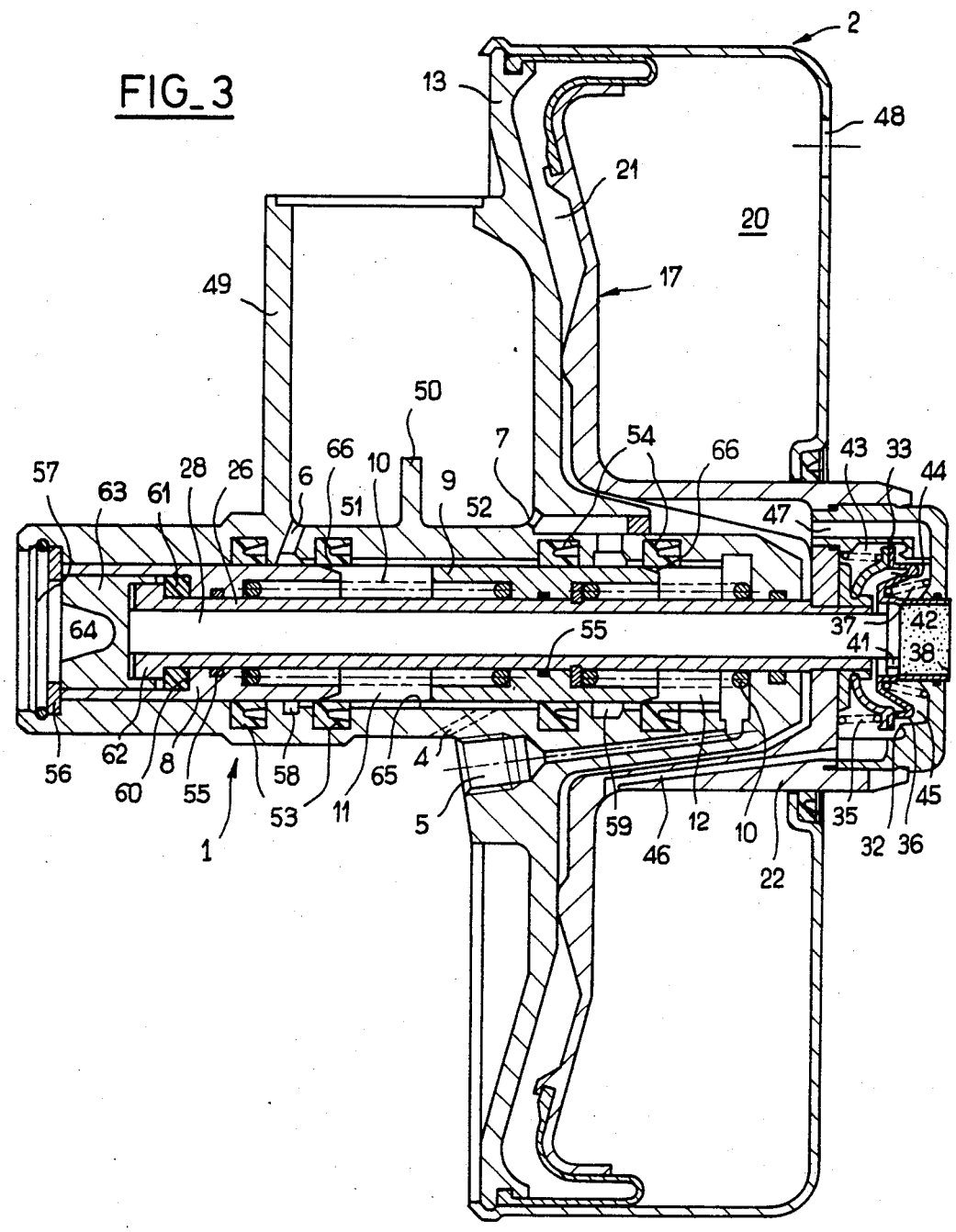
FIG_3

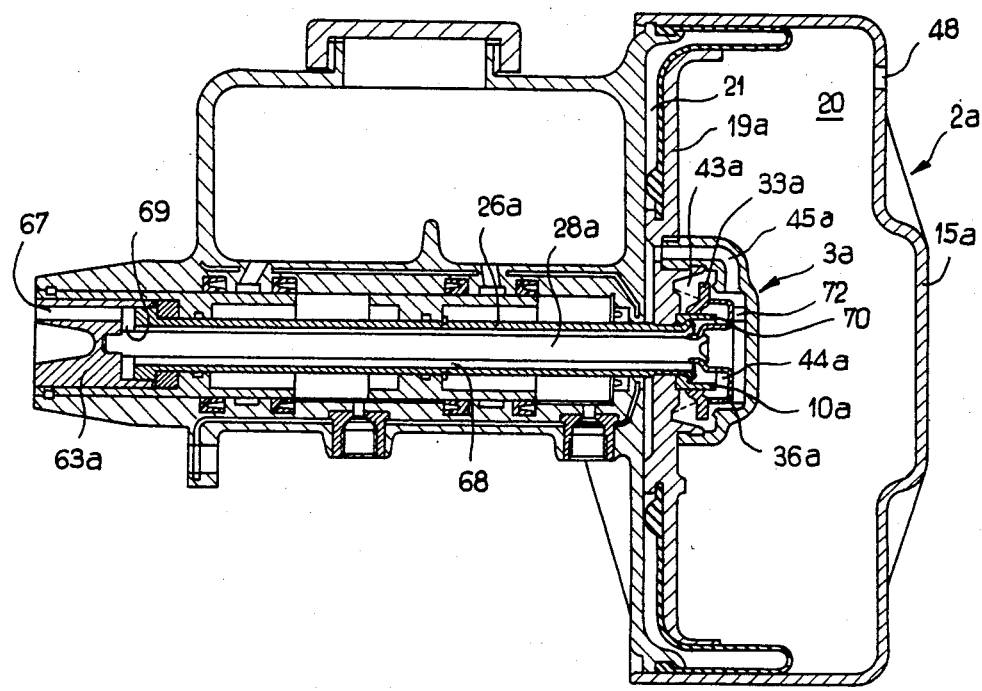
FIG_4

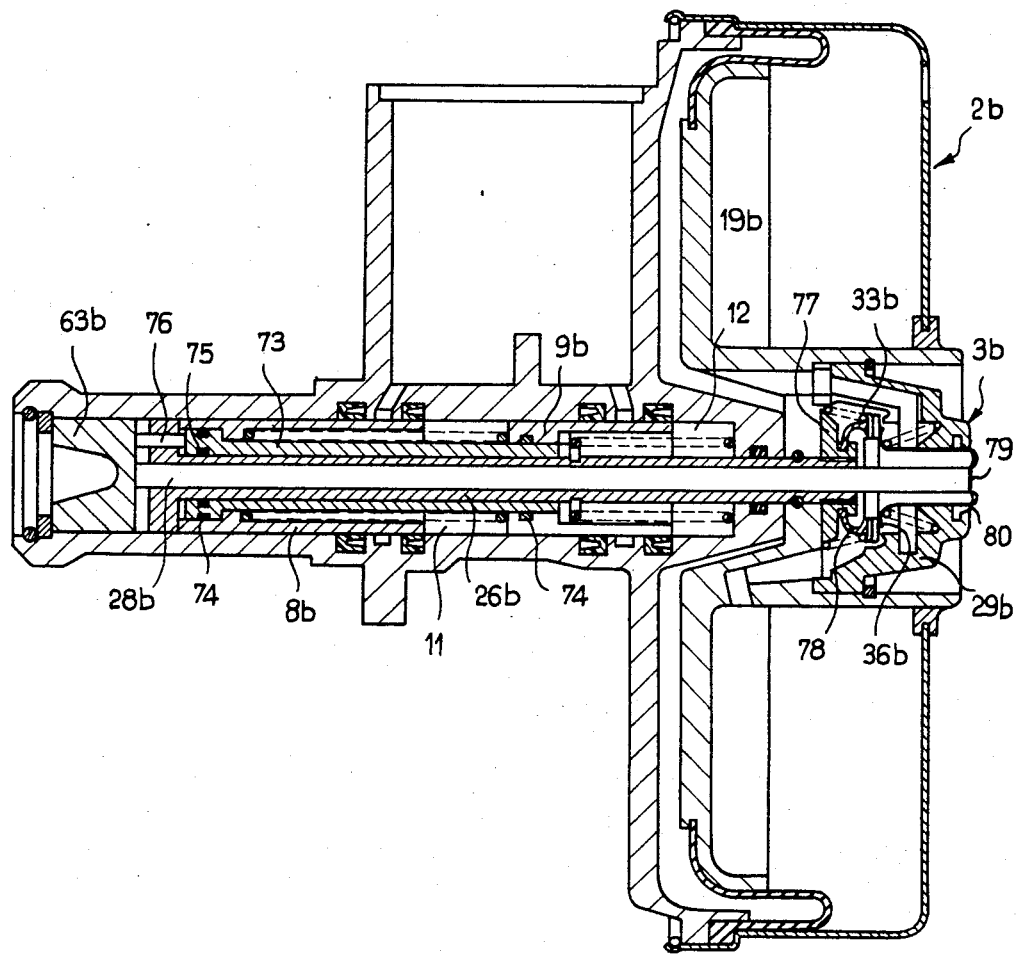
FIG_5

MASTER CYLINDER AND BRAKE BOOSTER ASSEMBLY

This is a continuation of copending application Ser. No. 283,592 filed July 15, 1981, now abandoned.

The invention concerns a master-cylinder and brake booster assembly of reduced length and weight.

The master-cylinder and brake booster assemblies used in brake installations on vehicles generally comprise a master-cylinder, which can be for one or two hydraulic circuits, the piston of which is connected to an actuation element through a control and reaction valve and to the diaphragm or the piston of a depression chamber. For constructional purposes, the means for fastening the assembly to the body of the vehicle are on the rear wall of the depression chamber through which passes the piston actuation element. The master-cylinder is fastened to the wall opposite this chamber, distant from the fastening means, so that the total length of the pressure amplifying assembly is the sum of the construction lengths of the depression chamber and of the master-cylinder itself, taken independently.

Generally, these master-cylinder and booster assemblies are installed on the firewall of the vehicle, inside the engine compartment, and their length is the dimension which meets with the most restrictions when choosing the adequate location for the unit. From this, it can be deduced that, in automobile construction, there is a genuine demand for pressure amplifying units for hydraulic brake installations which occupy a more reduced longitudinal space than do the units available on the market.

This invention improved pressure amplifying master-cylinders in that it solves the problems mentioned in a highly favourable manner.

To this aim, the invention concerns a braking pressure generating system, comprising a depression chamber, equipped with two axial walls, a diaphragm or piston and a master-cylinder for one or two hydraulic brake systems, the piston of which is fastened to a diaphram and to a depression control valve, which is actuated by the brake control element; characterized by the fact that the diaphragm or piston of the depression chamber is fastened to an actuation rod which protrudes from said depression chamber through the corresponding axial wall of its atmospheric actuation enclosure, and by the fact that the master-cylinder is located next to this wall so that it is actuated by traction by the diaphragm.

According to another purpose of the invention, the master-cylinder itself can either be fastened or else made in one piece with the wall of the atmospheric actuation side of the depression chamber of the booster, or it can be independent of the booster assembly. In any case, the control valve can be installed on the depression chamber piston, and the rod of the latter can be tubular and act as a guide for a rod which is axially movable, connected to a movable part of the valve and receiving the brake actuation element. This tubular rod can also act as an atmospheric air passage or as an air inlet for the control valve. Preferably, the diaphragm of the depression chamber has a tubular neck which protrudes, sliding hermetically, through an orifice of the depression chamber.

Further reduction of the pressure ampliflying assembly can be obtained another characteristic of the invention, according to wherein the master-cylinder crosses the wall of the atmospheric actuation side of the depression chamber. Part of the master cylinder length is housed in the tubular length of the diaphragm. Moreover, the master-cylinder itself and/or the wall of the atmospheric side of the depression chamber can form a reservoir for the hydraulic brake fluid.

According to another characteristic of the invention, the master-cylinder is intersected axially by the tubular rod of the depression chamber diaphragm. Its piston or pistons are annular and slide freely and hermetically with the outside surface of the rod, and also with the interior surface of the cylinder. The end of the rod distant from the depression chamber forms a head, housed in a cavity of the piston or primary piston of the cylinder, and the head bears against the bottom of this cavity by means of an elastic reaction element. As an alternative, this elastic reaction element can be replaced by a hydraulic reaction device which can include, for instance, a sliding hermetically closed sleeve, in relation to the outer surface of the tubular rod and also in relation to the interior surface of the master-cylinder annular piston or pistons. The sleeve includes one end and/or one inner step, exposed to the pressure of at least one of the enclosures of the cylinder in question, and mechanically connected to a body sliding at the free end of the latter and receiving the brake actuation element.

The attached schematic drawings show non-limitative examples of this invention and some prefered embodiments.

FIG. 1 shows an axial cross-section of a booster depression chamber which incorporates the improvements of the invention, and where it is assumed that the associated mater-cylinder is located to the left;

FIG. 2 shows a similar view, but the master-cylinder is part of the wall on the atmospheric actuation enclosure side of the depression chamber;

FIG. 3 shows an equivalent view to the previous ones, in which the rear wall of the booster incorporates a reservoir for the hydraulic fluid, the master-cylinder being partly housed inside the depression chamber;

FIG. 4 is a view similar to the previous ones, in which the control valve is enclosed in the depression chamber;

FIG. 5 shows another alternative, in which a hydraulic reaction device has been provided.

FIGS. 1 to 3 show a depression assisted pressure amplifying master-cylinder unit, comprising the actual master-cylinder or the hydraulic cylinder 1 (omitted in the case of FIG. 1), a depression chamber 2 and a control valve 3.

The hydraulic cylinder 1 is intended to feed the two independent brake cylinders output connections 4 and 5 from the two hydraulic feed ducts 6 and 7 and to this end a primary piston 8 and a secondary piston 9 which are tandem mounted inside the cylinder and separated by means of coil springs 10 so as to define the two independent pressure enclosures 11 & 12 corresponding to the brake systems mentioned. The depression chamber has a rear wall 13, equipped with lugs, see FIG. 1, with threaded openings 14 for fastening the device to the point of utilisation: a front wall 15, rigidly and hermetically fastened to wall 13 by means of peripheral crimping 16, and an assisting piston indicated by the general reference 17, and formed of an annular flexible diaphragm 18 peripherally fastened to the crimping 16 and, by its inner edge, to a rigid plate so that it defines, within the depression chamber, a suction enclosure 20 and an atmospheric enclosure 21.

The plate 19 extends centrally as a tubular hub 22 having a cylindrical exterior surface extending outside the forward wall 15 of the depression chamber through a central orifice in the latter, with which it adjusts hermetically by means of a gasket means 23. Close to the outer extremity of the hub 22, is a diametral wall 24 which separates two enclosures, the inside enclosure is part of the atmospheric actuation chamber 21, whilst the outside enclosure 25 forms a receptable for the control valve 3. The wall 24 has a tubular rod 26 fastened rigidly to it, which crosses it and protrudes outside the depression chamber through an orifice equipped with a gasket 27 provided on the front wall 13. This rod can be fastened to a distant master-cylinder, not shown on FIG. 1, or else to a master cylinder which is part of the wall 13 as is shown by FIG. 2 and following. A control valve drive rod 28 slides freely inside rod 26 and the left-hand end of this control-rod receives actuation as will be described below, and the right-hand end enters the enclosure 25 for the control valve 3.

For the cases shown in FIGS. 1 to 3, the control valve 3 includes a bowl-shaped box 29 hermetically fastened to the enclosure 25 by means of a crimp 30, and of a gasket 31. Its internal surface forms an intermediate seat 32 opposing a plug or cup 33 fastened to a part 34 which slides on the end of the assisting rod 26 and the cup is biased into closing position by a compression spring 35. Further, inside the contour of the intermediate seat 32 is another plug 36 which is applied against the plug 33 by means of a compression spring 37. The plug 36 extends forward to form a sleeve 38 which slides hermetically by means of a gasket 39 in an axial orifice of the bottom of the bowl 29. The inner end of this sleeve has a thrust plate 40, against which is applied the end of the control rod 28 and which has several orifices 41 which communicate with the exterior atmosphere through an air filter 42.

The inside of the bowl 29 is provided with three independent enclosures 43, 44 and 45. The first communicates with the suction enclosure 20 through line 46; enclosure 45 communicates through the atmospheric actuation side 21 of the depression chamber by line 47, and the enclosure 44, between the two plugs 33 and 36 in the position shown on FIGS. 1 to 3, communicates with the outside atmosphere through orifices 41 and air filter 42.

The operation of this valve device is conventional. In idle position as represented in the figures, the depression taken at the motor admission collector reaches enclosure 20 through a tube connected to opening 48 and reaches the atmospheric actuation enclosure, through line 46, enclosures 43 and 45 and line 47; the piston 17 receives no pressure increase on any of its surfaces, and the assembly is maintained in the position represented by means of a spring which is not shown but which can be either inside the depression chamber or associated with the assisting rod 26 to an exterior point of the assembly. When braking starts, the control rod 28 first of all moves the sleeve 38 and the plug 36 to the right, which allows plug 33 to bear against the seat 32 thus isolating the two enclosures 43 & 45 from each other and, consequently, isolating the suction and actuation chambers of the depression chamber. Continuing actuation of the control rod 28, the plug 36 becomes separated from the plug 33 so that the enclosures 44 and 45 now communicate with each other, which means that the atmospheric enclosure 21 is placed in communication with the atmosphere through line 47, enclosures 45 and 44, orifices 41 and air filter 42; the atmospheric pressure entering enclosure 21 moves piston 19 and all the part fixed to the latter to the right of the figure, producing actuation of the pistons of the master-cylinder.

Although FIG. 1 shows the possibility of installing the master-cylinder at any adequate point of the vehicle, independently of the depression chamber 2, FIG. 2 shows the possibility of forming it in one piece with the forward wall 13 of the latter. It could also be fastened by means of an adequate plate to the fastening devices applied to the threaded openings 14 on FIG. 1.

In accordance with FIG. 3, the tubular hub 22 on the piston 19 of the depression chamber facilitates the utilisation of another characteristic of the invention. As can be seen, the master-cylinder 1, formed in one piece with the wall 13, is positioned in such a way that part of its length is housed inside the tubular hub 22, so as to reduce the overall length of the system. Although the end of the hub 22 will then protrude from the depression chamber during operation of the device, one must take into account that fact that the transversal section of the hub in question is far less than that of the depression chamber, and that it is relatively simple to find a corresponding hollow space inside the engine compartment.

FIG. 3 also shows the possibility of using a hydraulic fluid feed tank in one piece with the assembly, consisting of a closed wall 49 and a transversal wall 50 which is less high and which separates the two enclosures 51 and 52, from which run the feed lines 6 & 7 for the two brake enclosures of the tandem master-cylinder 1.

The two assisting 26 and control 28 rods extend to near the front end of the master-cylinder 1, and the two pistons primary 8 and secondary 9 are tubular and slide freely inside the cylinder, forming a hermetic closure with the latter by means of pairs of gaskets 53 and 54, located in corresponding grooves in the smooth interior surface of the cylinder, and with the assisting rod by means of gaskets 55. The two pistons are kept in position in their usual form by means of a washer 56 and an elastic ring 57.

The two hydraulic pistons 8 and 9 have smooth cylindrical lateral surfaces, and the gaskets 53 and 54 of each pair are next to a corresponding annular groove 58 and 59 communicating with lines 6 & 7 from reservoirs 51 and 52. The primary piston 8 is provided with a broadened cavity so as to form an intermediate step 60 which forms a seat for an elastic washer 61 which acts as an elastic reaction block. Consequently the assisting rod 26 comprises an outer flange 62 which bears against the washer. Actuation is made by means of sliding member 63 which slides inside the primary piston 8 and is equipped with a ball joint seat 64 or any other adequate connection element for receiving the pedal rod. It bears against the left end of the control rod 28 of the control valve 3.

The operation of this elastic reaction device is conventional.

As can be seen, the brake line 4 communicates with one or more grooves 65, formed longitudinally on the interior surface of the hydraulic master-cylinder and which run between the closest gaskets of the two pairs 53 and 54. Because of this, it is no longer necessary to allow the usual stroke distances between line 4 and the adjacent ends of the pistons, since communication between the enclosure 11 and the line in question is ensured in all positions of the pistons through the grooves 65. Elimination of the said stroke distances makes it possible to make further considerable economies in the length of the master-cylinder and in the weight of the material employed for the latter.

The device can be completed with other conventional details such as grooves or chamfers 66 which, in idle position of the assembly, provide communication between the brake enclosures 11 & 12 and the corresponding feed grooves 58 & 59 in order to compensate the volume variations of fluid in the brake lines.

As shown on FIG. 2, a protection cover 90 for the valve 3 may be screwed on a threaded sleeve portion 91 which protrudes from wall 15.

Broadly speaking, operation of the booster described is as follows:

Depression from the engine is communicated with the suction enclosure 20 of the chamber 2 through a tube (not shown) fastened to the opening 48, line 46, enclosures 43 and 45 of control valve 3, and line 47 to also communicates with the atmospheric actuation enclosure 21 so that piston 17 is not submitted to any fluid pressure differential and the assembly remains in the position shown through the action of a spring which is not shown.

At the beginning of braking, the sliding member forming thrust element 63 moves the control rod to the right, and this in turn thrusts the part 38 against the action of the spring 37, which allows the plug 33 to be applied against the seat 32 through the action of the spring 35. From then on, the enclosures 43 & 45 are isolated and, consequently, the enclosures 21 & 20 of the depression chamber are also isolated.

Continuing movement of the control rod separates the plug 36 from the plug 33, so that enclosure 45 is connected to enclosure 44. That is, the atmospheric actuation enclosure 21 of the depression chamber 2 communicates with the exterior through the line 47, the enclosures 45 & 44, the orifices 41 and the air filter 42, and the atmospheric pressure which is established in the enclosure 21 actuates the piston 17 so that the tubular assisting rod 26 acts, by means of its flange 62 on the primary piston 8, through the elastic reaction washer 61, which initiates the braking stroke.

When the action of the thrust element 63 ceases, the parts return to the idle position shown, under the action of the return spring mentioned previously.

FIG. 4 shows an alternative in which the control valve 3a is totally contained inside the depression chamber 2a. In this case, the rear wall 15a of the latter is continuous, and the atmospheric air intake for the valve occurs inside the vehicle passenger compartment, through an orifice 67 of the thrust element 63a and a channel 68 formed by an adequate difference in diameters between the assisting rod 26a and the control rod 28a. For this, both the orifice 67 and the channel 68 communicate with an enclosure 69 formed between the thrust element 63a and the adjacent end of the assisting rod. At the opposite end, the latter is riveted to plate 19a to carry a part shaped as an externally cylindrical cup 70, which serves as a guide for the plug 33a. The control rod 28a is fastened to the actuation end of the thrust element 63a and, by the opposite end, it is centrally riveted to a part shaped as an annular bowl. The bowl is guided axially by peripheral ribs 72 which, on the inside, protrude from the valve box 29a with the concavity turned toward the plug 33a so that its edge bears against the latter. Therefore, the bowl forms a plug 36a, which is equivalent to plug 36.

In accordance with the above, the corresponding valve enclosures 43a, 44a and 45a are formed. Operation is identical to that described in the previous example.

For the embodiment shown in FIG. 5, a hydraulic reaction device is provided. To this end, a sleeve 73 is provided between the primary 8b and secondary 9b pistons. The assisting rod 26b slides freely in relation to the sleeve 73 and adjusts hermetically to the pistons by means of gaskets 74 and to the sleeve 73 by means of a gasket 75. One end of the sleeve communicates with the brake enclosure 12 corresponding to the secondary piston, so that it is submitted to the working pressure of the brake line corresponding to this enclosure. This sleeve also could comprise a step located inside enclosure 11 to provide for a similar effect. The other end of the sleeve abuts a lug 76 which is guided longitudinally in an orifice formed parallel to the cylinder shaft and which bears against the thrust element 63b. The element 63b transmits a hydraulic reaction force generated by the sleeve 73 which is proportional to the pressure existing in the working enclosure 12.

In this case, the control valve 3b, although operating along the same principles as in the previous cases, is of slightly different construction.

The assisting rod 26b in FIG. 5 has a screwed nut 77 which links it to the plate 19b of the depression chamber piston. The nut 77 has an annular groove on which is centrally fastened an elastic body shaped as a housing 78, the free edge of which forms the plug 33b, which is equivalent to those with the same numerical references in the previous examples. The control rod 28b bears against the base of a part shaped as a cup 79 with a cylindrical exterior and which adjusts hermetically by means of a gasket 80 to an orifice of box 29b, the broadened edge of which forms the plug 36b which is equivalent to those with the same numerical references in the previous examples.

The operation of this valve is the same as in the examples described above, and it can be clearly followed on FIG. 5.

In the various examples described, certain elements or parts for which references are not given or which are not specifically described, are conventional, and their functions can easily be understood by a skilled man.

It can be seen that the invention meets the objectives set in an extremely advantagious manner, especially in the case shown on FIG. 3, wherein the combination of the grooves 65 with the length of the master-cylinder itself being housed inside the depresson chamber, makes it possible to considerably reduce the overall length of the pressure amplifying unit.

We claim:

1. A brake control unit for an automotive vehicle, comprising a low pressure booster with a hermetically closed housing having two opposite walls, and a brake master cylinder connected to a first of said opposite walls, a movable piston wall dividing interiorly said housing into a vacuum chamber to be permanently connected to a vacuum source and a control pressure chamber adjacent the first wall of said housing, said piston wall being movable axially in response to actuation of a control valve by a control rod extending longitudinally through said master cylinder, the control valve being arranged centrally on said movable wall and selectively controlling communication of the control pressure chamber with the atmosphere, said control valve housed in a control valve casing, an opening being formed in the second of said opposite walls and the second wall opposite said master cylinder, said master cylinder having a housing and slidingly receiving therein at least a primary piston connected to said movable wall by an elongated actuation member, means on said master cylinder for mounting said unit on a stationary support of said vehicle, the elongated actuation member being tubular and extending longitudinally centrally through said master cylinder and the control rod extending slidably within the tubular elongated actuation member, the control valve comprising a first admission valve member on an atmospheric side of said control valve and operatively connected to said control rod, said control valve also disposed in a movable wall tubular hub portion extending axially in the vacuum chamber, the tubular hub portion sealingly extending through said opening in said second wall, the control valve casing in constant communication with the atmosphere and the control valve disposed outside the booster directly in front of the second wall and remote from the master cylinder.

2. A brake control unit according to claim 1, wherein said tubular elongated actuation member has an end opposite said moveable wall forming an outwardly radially extending flange for cooperation with an adjacent annular step of said primary piston of said master cylinder.

3. A brake control unit according to claim 2, further comprising an annular elastomeric reaction member interposed between said flange of said tubular elongated actuation member and said annular step of said primary piston.

4. A brake control unit according to claim 3, wherein said master cylinder further includes a secondary piston sealingly slidingly mounted on said tubular elongated actuation member.

5. A brake control unit according to claim 1, wherein a portion of said master cylinder housing extends within said hub portion of said movable wall.

6. A brake control unit according to claim 1, further comprising a protective cover for said tubular hub portion, the protective cover secured at said second wall and stationary relative to said hub portion.

7. A brake control unit for an automotive vehicle, comprising a master cylinder having at least a piston slidingly arranged therein and a vacuum booster supported at one end of said master cylinder, the vacuum booster comprising a housing, a first housing wall secured to one end of said mater cylinder, an opposite second housing wall with both housing walls defining a sealed enclosure, and a movable piston wall dividing interiorly said enclosure into a control chamber adjacent said one end of said master cylinder and a vacuum chamber for permanent connection to a vacuum source, said piston wall having a tubular hub portion and being coupled to said piston of said master cylinder and movable axially in response to actuation of a control valve housed in a control valve casing supported centrally on said piston wall, the control valve selectively controlling communication of said control chamber with the atmosphere, wherein said vacuum chamber is annular and the second housing wall is formed with a central opening having sealng means, the control valve casing including a central aperture opposite said one end of said master cylinder communicating permanently with the atmosphere, said tubular hub portion and sealing means forming a seal to prevent fluid communication between atmosphere and the vacuum chamber, said central aperture permitting fluid communication between atmosphere and the control valve.

8. A brake control unit according to claim 7, wherein said control valve is actuatable by a control rod extending centrally longitudinally through said master cylinder and through a central portion of said piston wall.

9. A brake control unit according to claim 8, wherein said control valve communicates with said control chamber through said central portion of said piston wall.

10. A brake control unit according to claim 7, wherein the control unit comprises a hydraulic reaction device.

11. A brake control unit according to claim 10, wherein the hydraulic reaction device comprises an elongated actuation member coupling said piston and piston wall, and a sliding sleeve sealingly engaging an exterior surface of the actuation member and an interior surface of the piston of the master cylinder, the sleeve having one of an interior end and a step subjected to fluid pressure of a pressure enclosure of the master cylinder, and the sleeve connected to a sliding body which is displaced by a brake actuation element.

12. A brake control unit according to claim 7, further comprising a protective cover about said control valve casing, the protective cover secured at said second housing wall and stationary relative to said control valve casing.

* * * * *